United States Patent [19]
Daly et al.

[11] Patent Number: 5,098,064
[45] Date of Patent: Mar. 24, 1992

[54] ENGINE THROTTLE BLADE SEALING

[75] Inventors: Paul D. Daly, Troy; Robert A. McArthur, Drayton Plains, both of Mich.

[73] Assignee: Siemens Automotive L.P., Auburn Hills, Mich.

[21] Appl. No.: 720,971

[22] Filed: Jun. 25, 1991

Related U.S. Application Data

[62] Division of Ser. No. 481,076, Feb. 16, 1990, Pat. No. 5,035,214.

[51] Int. Cl.⁵ .............. F02D 9/10; F16K 1/226; B21D 53/84
[52] U.S. Cl. ............... 251/306; 29/890.127
[58] Field of Search ........... 123/337, 403; 251/305, 251/306, 357, 358; 29/890.12, 890.124, 890.126, 890.127

[56] References Cited

U.S. PATENT DOCUMENTS

| | | | |
|---|---|---|---|
| 2,886,284 | 5/1959 | Wheatley | 251/358 |
| 3,050,781 | 8/1962 | Killian | 29/890.127 |
| 3,193,914 | 7/1965 | Killian | 29/890.127 |
| 3,275,289 | 9/1966 | Fawkes | 29/890.124 |
| 3,318,567 | 5/1967 | Gifford | 29/890.127 |
| 3,593,400 | 7/1971 | Geiselman et al. | 29/890.127 |
| 4,154,426 | 5/1979 | Santy et al. | 251/357 X |
| 4,510,965 | 4/1985 | Peroux et al. | 251/305 X |
| 4,773,625 | 9/1988 | Calvin | 251/305 X |

FOREIGN PATENT DOCUMENTS 3243996  5/1984  Fed. Rep. of Germany ...... 123/337

Primary Examiner—Willis R. Wolfe
Attorney, Agent, or Firm—George L. Boller; Russel C. Wells

[57] ABSTRACT

The throttle blade is made to have a resilient outer margin whose outside diameter is circular and essentially equal to the diameter of the throttle bore within which the blade is disposed. The blade can maintain control even at engine idle. Several embodiments of throttle blade are disclosed. In one, an elastomeric seal is insert-molded onto the main blade body; in another, the seal is a multitude of short bristles; in still another, it is a stamped polytetrafluoroethylene part. There is also a special construction for assembling the shaft.

2 Claims, 3 Drawing Sheets

ENGINE THROTTLE BLADE SEALING

This application is a division of application Ser. No. 07/481,076, filed Feb. 16, 1990 now U.S. Pat. No. 5,035,214.

FIELD OF THE INVENTION

The invention relates to devices that control the flow of combustion air into an internal combustion engine, commonly called throttle body or air body assemblies, particularly to the throttle blades of these devices.

BACKGROUND AND SUMMARY OF THE INVENTION

Typically, the major constituent parts of these devices, such as the bodies, blades, and shafts, are made of suitable metals, and the shafts are often journaled on the bodies by means of metal bearings, such as ball bearing races. The main bore through the body is finished to proper diameter. The blade is either machined or stamped, and then must be individually adjusted on the shaft at assembly to secure proper fit.

In order to co-jointly attain desired throttling characteristics and assure consistently proper functionality, it is necessary for the bore and blade geometry and construction to be exact, rigid and dimensionally stable. At engine idle, the blade-to-bore clearance must be quite small, a typical radial gap between blade and bore having an area equivalent to a hole of about 0.10 inch diameter. Heretofore, it has been typical design practice to make the throttle blade of non-circular shape, one prevalent shape being elliptical. Production tolerances must be closely controlled, and the impact of thermal, chemical, and/or mechanical interactions that may be encountered in service must be minimized. Accordingly, significant costs are associated with the production of throttle bodies of automotive internal combustion engines, and this is an area where meaningful cost savings can be attained with innovative technology.

The present invention represents new technology that can provide improvements nd meaningful cost savings through novel throttle blade constructions. A throttle blade embodying principles of the invention can be manufactured in a circular shape in such a way that it can attain the same or better throttling and functional characteristics possessed by prior non-circular blades without incurring many of the expenses that are associated with the manufacture, assembly, and adjustment of the prior blades.

Stated briefly and in a somewhat generic way, a throttle blade according to one aspect of the invention comprises a rigid main blade body that can be either metal or composite (plastic) and that contains a resilient seal around at least a majority of its outer margin, the radially outermost portion of the seal lying on a circle whose diameter is essentially equal to that of the circular throttle body bore within which the throttle blade is disposed in the throttle body assembly. Several embodiments of seals will be described.

One of these embodiments is an elastomeric seal that is insert-molded onto the outer margin of the main blade body, and another aspect of the invention involves the method of making this embodiment of blade.

Moreover, the use of an elastomeric seal allows the throttle body to be fabricated by molding of a composite material so that machining of the throttle bore is unnecessary. Fabrication of the main blade body by the molding of composite allows the blade and shaft to be assembled together in an expedient manner, and also gives rise to an expedient way to fabricate the shaft.

A circular shape for the radially outermost part of the blade, coupled with resiliency thereof, is more tolerant of the normal dimensional variations that occur in the mass production of throttle body assemblies. Moreover, the effect of friction between the blade and the wall of the throttle bore becomes less significant because primary contact between the two will occur at smaller radii from the shaft as viewed along the shaft axis.

Further features, advantages, and benefits of the invention will be perceived by those skilled in the art from studying the ensuing description and claims. Drawings accompany the disclosure and illustrate the inventive principles in presently preferred embodiments representing the best mode contemplated at this time for carrying out the various aspects of the invention.

DESCRIPTION OF THE PREFERRED EMBODIMENT

Figure 1:
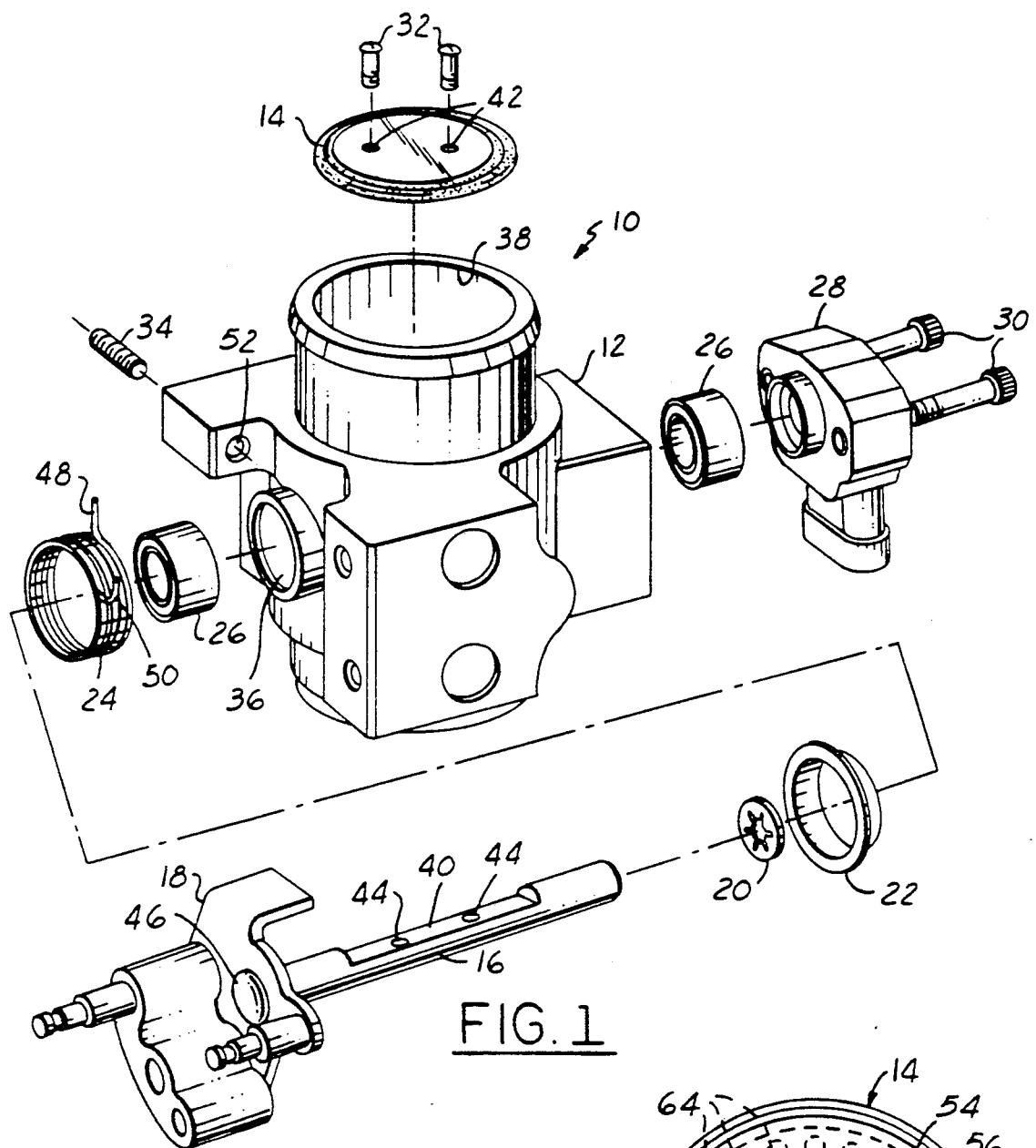
FIG. 1 is an exploded perspective view of a first embodiment of throttle body assembly containing inventive principles.

The exploded throttle body assembly 10 shown in FIG. 1 comprises: a throttle body 12; a throttle blade 14; a shaft 16; a lever 18; a push nut 20; a spring guide 22; a torsion return spring 24; two bearing assemblies 26; a throttle position sensor (TPS) 28; two throttle position sensor fastening screws 30; blade fastening screws 32; and a set screw 34.

Bearing assemblies 26 fit in opposite ends of a transverse bore 36 that transversely intersects a circular throughbore 38 via which combustion air is inducted into an internal combustion engine (not shown) when the throttle body assembly is in use on such engine. In assembly, shaft 16 is journaled on throttle body 12 via bearing assemblies 26 such that a notch 40 on the shaft is disposed within throughbore 38 so that throttle blade 14 can also be disposed within throughbore 38 to seat in the notch and be securely fastened to the shaft by means of screws 32 passing through holes 42 in the blade and threading into holes 44 in the shaft.

Shaft 16. lever 18, and push-nut 20 form a shaft assembly in the following way. The lefthand end of shaft 16 as viewed in FIG. 1 comprises an integral circular head 46 whose diameter is greater than that of a hole (unnumbered) in lever 18 through which the shaft passes. In order for the shaft and lever to be rotatably coupled, the hole in the lever through which the shaft passes and the portion of the shaft that lies immediately adjacent head 46 are keyed together. The remainder of the shaft that lies to the right of this keyed connection, with the exceptions of the far end and that portion which is co-extensive with notch 40, is circular. Push-nut 20 is pushed onto the righthand end of the shaft and past notch 40 until it is brought into abutment with one side of lever 18. Since the other side of the lever is in abutment with head 46, the lever is axially captured on the shaft between head 46 and push-nut 20. This then forms the shaft assembly.

Now the shaft assembly is assembled to the throttle body by passing the righthand end of shaft 16 through spring guide 22 and return spring 24 and inserting it into the lefthand bearing assembly 26. The shaft is passed through the bore until the righthand end exits the far side of the throttle body. While the ensuing attachment of throttle blade 14 to shaft 16 will prevent the shaft assembly from being withdrawn out of the throttle body, it may be nonetheless desirable to assemble a second push-nut (not shown) onto the protruding end of the shaft for the purpose of retaining the shaft assembly on the throttle body in any event.

A throttle position sensor 28 is now placed over the protruding end of shaft 16 and fastened to the throttle body by screws 30. Since the rotation of the throttle shaft must be coupled to the input of the throttle position sensor, the end of the shaft that is disposed in the throttle position sensor may have a suitable keyed connection with the throttle position sensor input, assuming that the latter is keyed. In any event, provision must be made for operatively coupling the shaft with the throttle position sensor so that the latter can provide an electrical signal representative of the rotary position of the throttle shaft.

Return spring 24 has tails 48 and 50 for respective engagement with throttle body 12 and lever 18 to cause the lever, and hence the shaft and throttle blade too, to be resiliently biased in the counterclockwise sense as viewed from the lever side of the throttle body assembly. Idle position is established by abutment of the lever with the near protruding end of set screw 34 after the latter has been threaded through a threaded hole 52 in throttle body 12. In idle position, throttle blade 14 is essentially perpendicular to the axis of throughbore 38. Operation of lever 18 in the clockwise sense as viewed from the lever side of the throttle body assembly will cause the blade to increasingly open the throttle bore, but spring 24 will be effective to return the lever and throttle blade to idle position after the opening force on the lever has been removed.

Figure 2:
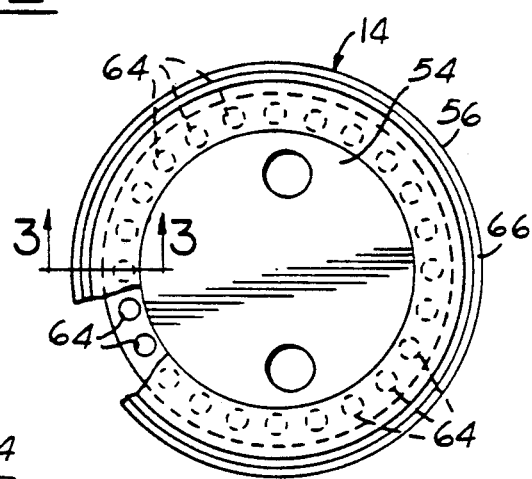
FIG. 2 is an enlarged plan view of one of the elements of FIG. 1 by itself.
Figure 3:
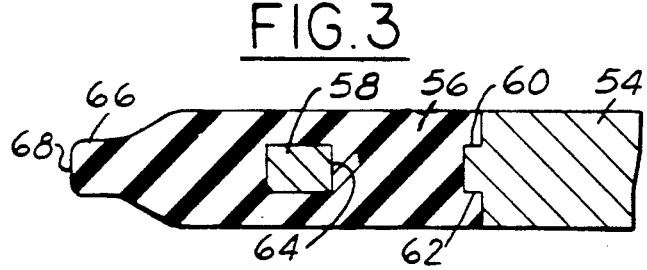
FIG. 3 is an enlarged fragmentary cross-sectional view taken in the direction of arrows 3—3 in FIG. 2.

FIGS. 2 and 3 present details of blade 14. Blade 14 comprises a main blade body 54 and an elastomeric seal 56 that extends circumferentially fully around the radially outer margin of the main blade body. Both main blade body 54 and seal 56 have circular shapes in plan, the latter being in the form of a single circular annular member.

Main blade body 54 is flat and of essentially uniform thickness throughout except at the circular radially outer margin. This latter region comprises a reduced thickness zone 58 that is imparted by providing symmetrical grooves 60 and 62 on opposites sides. A pattern of apertures, in the form of equally spaced apart through-holes 64, is provided in zone 58. The main blade body may be fabricated of metal by conventional machining or stamping procedures, or it can be molded from composite.

Seal 56 can be created in an advantageous manner by insert-molding elastomeric material onto main blade body 54. There are a number of materials that are suitable for seal 56; "Viton" possesses especially desirable characteristics. The sum of the thicknesses of zone 58 and of the elastomeric material that covers the zone and fills grooves 60 and 62 is equal to the nominal main body thickness so that the seal has a flush fit with opposite sides of the main blade body. The elastomeric material also fills holes 64 to provide a mechanical interlocking.

Beyond the radially outer edge of the main blade body, the elastomeric material is shaped such that its radially outer margin is in the form of a centrally disposed lip 66. The radially outermost portion of lip 66 is a circular surface 68 lying on a diameter of the blade that is essentially equal to the diameter of the circular wall of throttle body throughbore 38. The shaping of the lip, as perhaps best depicted by FIG. 3, is beneficial in achieving proper interaction with the wall of throughbore 38 for the range of production tolerances that are encountered in the mass-production of the throttle body assemblies. Wherever actual contact occurs, sealing action can be attained without excessive frictional interaction. Moreover, because the lip is circular, contact that does occur as the blade is being operated in the closing direction will take place along circumferential regions that are immediately adjacent the journal locations of the shaft, and whatever frictional force does occur will act on the shaft at an effective radius that is kept minimal and therefore results in less frictional torque being exerted on the throttle blade operation. The intention of the design is for the throttle blade to be essentially approximately at a right angle to the axis of throughbore 38 when in the engine idle position, meaning that the blade is within ±2° from a right angle to the bore axis. The parts are dimensioned, taking tolerances into account, such that the net open flow area for idle air is essentially equal to that of a small hole, such as was mentioned earlier.

Figures 3A, 4, 4A, 4B:
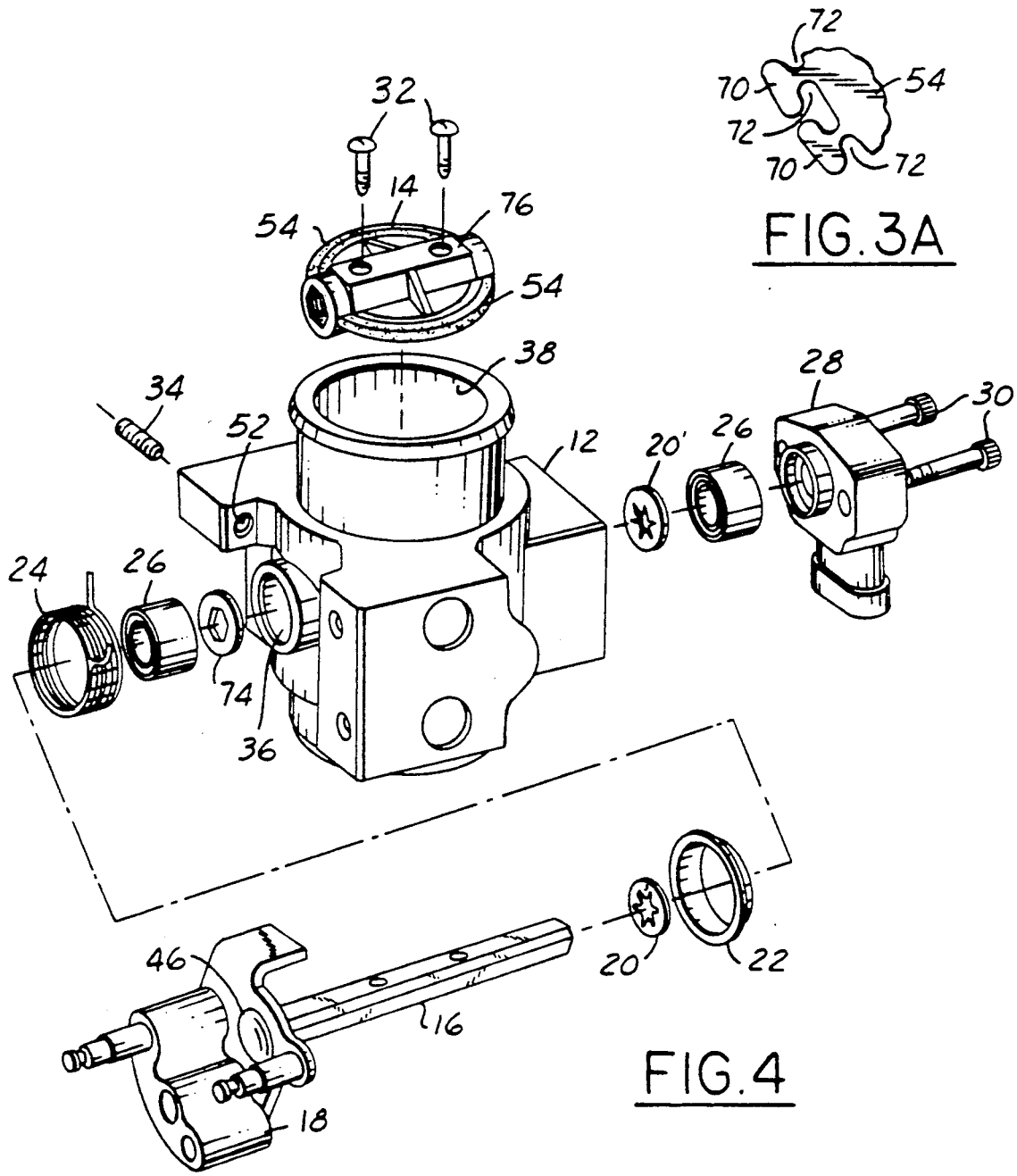
FIG. 3A is a fragmentary plan view of a modified form of element.
FIG. 4 is an exploded perspective view of a second embodiment of throttle body assembly containing inventive principles.
FIG. 4A is an enlarged perspective view of one of the elements of FIG. 4 by itself.
FIG. 4B is a fragmentary view of a modification.

Other forms of apertures in the main blade body for mechanical interlocking with the elastomeric seal material are also contemplated. FIG. 3A illustrates a pattern of radial teeth 70 having undercuts 72. The elastomeric material is insert-molded onto the outer main blade body margin to enclose the teeth and interlock with the undercuts.

FIG. 4 presents another embodiment of throttle body assembly, and the same reference numerals from FIG. 1 will be used to designate like parts. The embodiment of FIG. 4 differs from that of FIG. 1 in the construction of throttle blade 14 and shaft 16. Shaft 16 has a non-circular transverse cross-sectional shape, hexagonal being illustrated. Head 46 is integrally formed in shaft 16 and the hole in lever 18 through which the shaft passes is also hexagonal. Push-nut 20, lever 18, and shaft 16 form a shaft assembly in the same manner as described for FIG. 1, and it is assembled to the throttle body in the same way as previously described for FIG. 1, except a second push-nut 20' is inserted at the far end. FIG. 4 also shows the inclusion of a shaft seal 74 to accommodate the non-circular shape of the shaft.

Blade 14 of FIG. 4 comprises a composite molded main blade body containing a hexagonal sleeve 76 through which shaft 16 passes after the throttle blade is suitably disposed within the throttle body throughbore 38. In this way the throttle blade is automatically keyed to the shaft, although it may be desired to also employ fastening screws 32. If screws are not used, then pushnut 20' must be used. The blade of FIG. 4 also comprises an insert-molded seal 54, but one which is circumferentially discontinuous to allow for the termini of sleeve 76. In both embodiments, the seals nonetheless extend circumferentially around a majority of the radially outer margin of the main blade body.

A particular advantage of a non-circular shape for shaft 16 is that the shaft can be fabricated from conventional bar stock in an economical manner. Circular shafts usually require more expensive processing.

FIG. 4B shows a modification to the throttle body wherein the adjustment screw 34 and hole 52 are replaced by an integral idle stop 78 for lever 18. The ability of the present invention to accurately control the sealing of the throttle blade to the throttle bore may enable the idle stop to be integrally embodied in the throttle body, thereby giving rise to further economy in the manufacture, assembly, and calibration of the throttle body assembly. The illustrated idle stop 78 is in the form of a projection, and the extent to which it projects away from the throttle body will determine the idle position of the blade.

Figure 5:
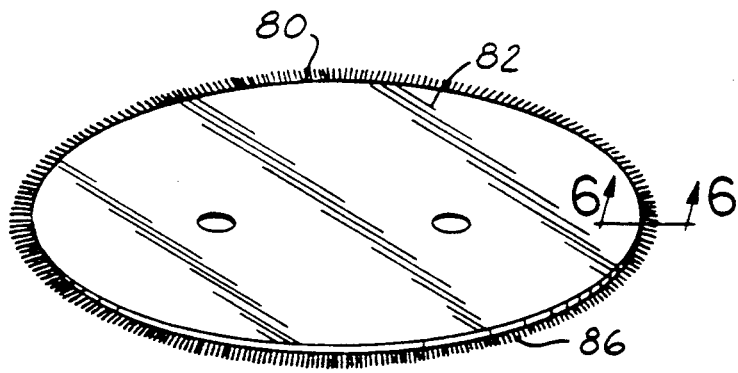
FIG. 5 is an enlarged perspective view of an element of another embodiment by itself.
Figure 6:
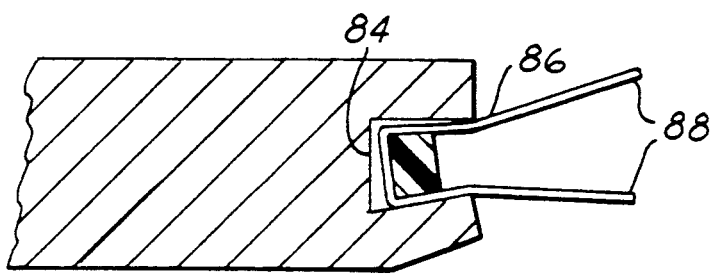
FIG. 6 is an enlarged fragmentary cross-sectional view taken in the direction of arrows 6—6 in FIG. 5.

FIGS. 5 and 6 reveal another throttle blade 80. This throttle blade comprises a main blade body 82 of circular shape and having a radially outwardly facing circumferential groove 84 extending around its perimeter. The seal 86 is in the form of a brush assembly whose radially inner portion is disposed in groove 84 and whose radially outer portion comprises a multitude of short bristles 88 that project radially outwardly of groove 84. The bristles have resiliency and are packed to a suitable density so that the sealing action of seal 86 is equivalent to that of the elastomeric seals previously described.

Figure 7:
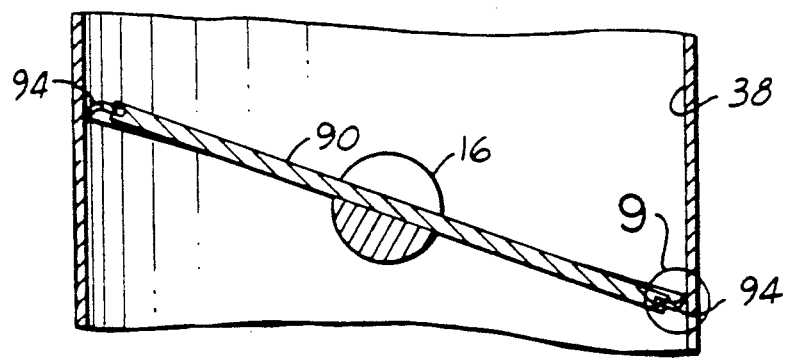
FIG. 7 is a fragmentary cross-sectional view of another embodiment.
Figure 8:
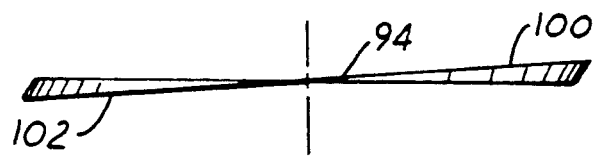
FIG. 8 is an edge view of one of the elements of FIG. 7 by itself.
Figure 9:
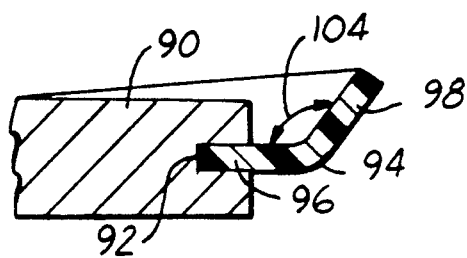
FIG. 9 is a fragmentary enlarged view taken in circle 9 of FIG. 7.

FIGS. 7, 8, and 9 present a further embodiment of throttle blade 88. It comprises a circular main body 90 having a radially outwardly facing groove 92. The seal 94 is one-piece and comprises for its radially inner portion a circular flange 96 that is lodged in groove 92. The radially outer portion of the seal comprises a free circular lip 98 consisting of two mutually exclusive substantially semi-circular segments 100 and 102. Each segment extends from a corresponding adjoining portion of flange 96 in the same direction as that in which it approaches the throttle body throughbore wall when the blade is being positioned in the direction of increasingly throttling air flow through the throughbore. The dimensional extent of each segment of the lip, as measured in a direction away from flange 96 is a maximum at the middle of each segment and progressively uniformly tapers down in the circumferential directions away from the maximum to essentially nothing at locations that are 90 degrees around the blade from the maximum. Furthermore, the segments 100, 102 are canted in the radially outward direction so as to form obtuse angles 104 with flange 96, as viewed in transverse cross section through the seal. It is not to be inferred that the two segments of the seal are always to be mirror images. Some differences may be incorporated due to the pressure differential acting on the seal when the blade is closed, or nearly closed. Note that under such a condition, one segment of the seal points toward the atmospheric side while the other points toward the vacuum side. A change in section thickness will adapt the concept to this situation, if improved sealing is required.

Polytetrafluoroethylene is a good material for seal 94 since it is formable to the desired shape, possesses adequate resiliency, also possesses certain lubricity, and can be assembled into the groove by shrink-fit procedures. It is also appropriate to mention that the blade main body can be fabricated by sintering or powdered metal techniques.

In use, the throttle blade is to be operated via an operating mechanism (not shown) attached to lever 18. The invention provides for blade positioning to any desired setting within a range of positions. The sealing means is effective such that when the blade is in idle position proper idle air flow through the throttle body occurs. Otherwise, the blade is sufficiently open that the sealing means has little or no effect on flow although the blade of course will exercise control over the flow. With such capabilities, economies can be realized in the manufacture, assembly, and calibration of throttle bodies.

While the throttle bodies that have been illustrated are intended for use in association with multi-point fuel injection systems, principles of the invention can be practiced with other types of engine fuel supply systems. Likewise, while a preferred embodiment of the invention has been disclosed and described, it should be appreciated that principles may be embodied in other equivalent embodiments as defined by the following claims.

What is claimed is:

1. The method of making a throttle blade for a throttle body assembly of an internal combustion engine which comprises:
   creating a main blade body with a radially outer margin at least a majority of whose circumferential extent is to receive a seal that is relatively less rigid than said main blade body, including creating one or more apertures in that portion of said radially outer margin that is to receive a seal; and
   molding material onto said portion of said main blade body to create such a seal, including molding said material into said one or more apertures, wherein said one or more apertures are throughholes extending through said main blade body, and the step of molding said material into said one or more apertures comprises molding said material completely through said one or more apertures to integrally join portions of said material that are disposed on opposite sides of said main blade body.

2. The method of making a throttle blade for a throttle body assembly of an internal combustion engine which comprises:
   creating a main blade body with a radially outer margin at least a majority of whose circumferential extent is to receive a seal that is relatively less rigid than said main blade body, including creating one or more apertures in that portion of said radially outer margin that is to receive a seal; and
   molding material onto said portion of said main blade body to create such a seal, including molding said material into said one or more apertures, wherein said one or more apertures are created in a reduced thickness portion of said main blade body and said molding step is conducted so as to cause the sum of the thicknesses of said reduced thickness portion and said material, as measured at said reduced thickness portion, to be substantially equal to the thickness of an immediately radially inner portion of said main blade body that is free of said material so as to obtain exterior flushness of said seal with said main blade body where the two join together.

* * * * *